United States Patent
Priore, III et al.

(10) Patent No.: US 11,428,212 B2
(45) Date of Patent: Aug. 30, 2022

(54) WIND TURBINE DRIVETRAIN WEAR DETECTION USING AZIMUTH VARIATION CLUSTERING

(71) Applicant: Inventus Holdings, LLC, Juno beach, FL (US)

(72) Inventors: Carmine A. Priore, III, Wellington, FL (US); Huiyi Zhang, Juno Beach, FL (US)

(73) Assignee: Inventus Holdings, LLC, Juno Beach, FL (US)

( * ) Notice: Subject to any disclaimer, the term of this patent is extended or adjusted under 35 U.S.C. 154(b) by 226 days.

(21) Appl. No.: 16/787,695

(22) Filed: Feb. 11, 2020

(65) Prior Publication Data

US 2021/0246881 A1     Aug. 12, 2021

(51) Int. Cl.
*F03D 17/00*     (2016.01)
*G01M 13/02*     (2019.01)

(52) U.S. Cl.
CPC ............. *F03D 17/00* (2016.05); *G01M 13/02* (2013.01); *G05B 2219/2619* (2013.01)

(58) Field of Classification Search
CPC ...... F03D 17/00; F03D 7/0204; G01M 13/02; G05B 2219/2619; F05B 2260/84; F05B 2270/329; F05B 2270/709; Y02E 10/72
See application file for complete search history.

(56) References Cited

U.S. PATENT DOCUMENTS

| | | | |
|---|---|---|---|
| 5,289,041 A | 2/1994 | Holley | |
| 7,677,869 B2 | 3/2010 | Martinez et al. | |
| 7,895,016 B2 | 2/2011 | Vittal et al. | |
| 8,839,656 B2 | 9/2014 | Frederiksen et al. | |
| 8,924,162 B2 | 12/2014 | Lapira et al. | |
| 9,797,328 B2 | 10/2017 | Martinez et al. | |

(Continued)

FOREIGN PATENT DOCUMENTS

| | | |
|---|---|---|
| EP | 2653722 | 10/2013 |
| WO | 2009016020 | 2/2009 |

(Continued)

OTHER PUBLICATIONS

Leahy, Kevin & Hu, R. & Konstantakopoulos, Ioannis & Spanos, Costas & Agogino, Alice. (2016). Diagnosing wind turbine faults using machine learning techniques applied to operational data. 1-8. 10.1109/ICPHM.2016.7542860. Jun. 2006.

(Continued)

*Primary Examiner* — Ziaul Karim
(74) *Attorney, Agent, or Firm* — Fleit Intellectual Property Law; Jeffrey N. Giunta

(57) ABSTRACT

Systems and methods to monitor a wind turbine azimuth drivetrain. Azimuth variation characteristics data are accumulated from wind turbines over a period of time. Clusters of values within the azimuth variation characteristics data are identified and a respective condition of the main drivetrain is associated with different clusters of values. After the associating, a measured set of azimuth variation characteristics data is received. A cluster corresponds to values in the measured set of azimuth variation characteristics data is determined and a condition associated with that cluster is determined to be a condition associated with the subject main drivetrain. That condition is then reported.

20 Claims, 7 Drawing Sheets

(56) References Cited

U.S. PATENT DOCUMENTS

| | | |
|---|---|---|
| 9,803,618 B2 | 10/2017 | Bankestrom |
| 9,897,516 B2 | 2/2018 | Bechhoefer et al. |
| 10,247,170 B2 | 4/2019 | Evans et al. |
| 2011/0020122 A1 | 1/2011 | Parthasarathy et al. |
| 2011/0148115 A1* | 6/2011 | Roznitsky ............... F03D 13/25 290/55 |
| 2012/0209539 A1 | 8/2012 | Kim |
| 2013/0116937 A1 | 5/2013 | Calhoun et al. |
| 2013/0147195 A1* | 6/2013 | Krug ...................... G01K 1/022 290/44 |
| 2015/0134189 A1 | 5/2015 | Wash |
| 2015/0322924 A1 | 11/2015 | Menasanch |
| 2016/0010628 A1 | 1/2016 | Dhar et al. |
| 2017/0234300 A1* | 8/2017 | Brødsgaard ............. F03D 7/046 416/1 |
| 2017/0372000 A1 | 12/2017 | Ethington et al. |
| 2018/0119677 A1 | 5/2018 | Qiao et al. |
| 2018/0223804 A1 | 8/2018 | Badrinath et al. |
| 2018/0320658 A1 | 11/2018 | Herzog et al. |
| 2018/0340515 A1* | 11/2018 | Huyn ...................... F03D 17/00 |
| 2018/0347544 A1* | 12/2018 | Grunnet ................ F03D 7/0296 |
| 2019/0277261 A1* | 9/2019 | Lütjen ..................... H02J 3/386 |
| 2021/0033066 A1* | 2/2021 | Beckerman ............. F03D 7/028 |

FOREIGN PATENT DOCUMENTS

| | | |
|---|---|---|
| WO | 2017157401 | 9/2017 |
| WO | 2018121668 A1 | 7/2018 |
| WO | 2019048597 A1 | 3/2019 |

OTHER PUBLICATIONS

M. C. M. Gowda, N. P. Mallikarjun, p. Gowda and R. Chandrashekhar, "Improvement of the performance of Wind Turbine Generator using Condition Monitoring techniques," 2013 7th International Conference on Intelligent Systems and Control (ISCO), Coimbatore, 2013, pp. 495-501. 2013.

A. Kusiak and A. Verma, "A Data-Mining Approach to Monitoring Wind Turbines," in IEEE Transactions on Sustainable Energy, vol. 3, No. 1, pp. 150-157, Jan. 2012.

Wang, Ke-Sheng & Sharma, Vishal & Zhang, Zhenyou. (2014). SCADA data based condition monitoring of wind turbines. Advances in Manufacturing. 2. 10.1007/s40436-014-0067-0. Mar. 2014.

Yang, Z.-X.; Wang, X.-B.; Zhong, J.-H. Representational Learning for Fault Diagnosis of Wind Turbine Equipment: A Multi-Layered Extreme Learning Machines Approach. Energies 2016, 9, 379. 2016.

* cited by examiner

WIND TURBINE DRIVETRAIN WEAR DETECTION USING AZIMUTH VARIATION CLUSTERING

FIELD OF THE DISCLOSURE

The present disclosure generally relates to monitoring the operation of wind turbines, and more particularly to detecting wear in the azimuth steering drivetrain of wind turbines.

BACKGROUND

Wind turbines are one technique used for generating electrical power from wind energy. Generally, wind turbines have blades on a rotor that transform energy in the wind to drive an electrical generator and thus produce electricity. In general, wind is able to arrive from any direction at a wind turbine. In order to effectively operate with wind arriving from different directions, the nacelle of the wind turbine is rotated around a vertical axis of the tower to change the direction in which the rotor faces. The direction that the rotor is facing in a horizontal plane is referred to herein as "azimuth." The azimuth of a wind turbine and is generally expressed as an angle relative to some reference direction, such as north. The azimuth pointing angle of the wind turbine is controlled by what is typically called an "azimuth controller." The azimuth controller generally sets an azimuth set point so that the rotor is substantially perpendicular to a plane of the blades attached to that rotor.

In various examples, wind measurement equipment located near the wind turbine measures wind direction and speed. These wind measurements are provided to the azimuth controller to support determining an azimuth set point that causes the wind turbine to face the oncoming wind. In normal operations, the azimuth angle that a wind turbine actually points to may vary around the azimuth set point set by the azimuth controller.

BRIEF DESCRIPTION OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present disclosure, in which.

DETAILED DESCRIPTION

As required, detailed embodiments are disclosed herein; however, it is to be understood that the disclosed embodiments are merely examples and that the systems and methods described below can be embodied in various forms. Therefore, specific structural and functional details disclosed herein are not to be interpreted as limiting, but merely as a basis for the claims and as a representative basis for teaching one skilled in the art to variously employ the disclosed subject matter in virtually any appropriately detailed structure and function. Further, the terms and phrases used herein are not intended to be limiting, but rather, to provide an understandable description.

The terms "a" or "an", as used herein, are defined as one or more than one. The term plurality, as used herein, is defined as two or more than two. The term another, as used herein, is defined as at least a second or more. The terms "including" and "having," as used herein, are defined as comprising (i.e., open language). The term "coupled," as used herein, is defined as "connected," although not necessarily directly, and not necessarily mechanically. The term "configured to" describes hardware, software or a combination of hardware and software that is adapted to, set up, arranged, built, composed, constructed, designed or that has any combination of these characteristics to carry out a given function. The term "adapted to" describes hardware, software or a combination of hardware and software that is capable of, able to accommodate, to make, or that is suitable to carry out a given function.

Figure 7:
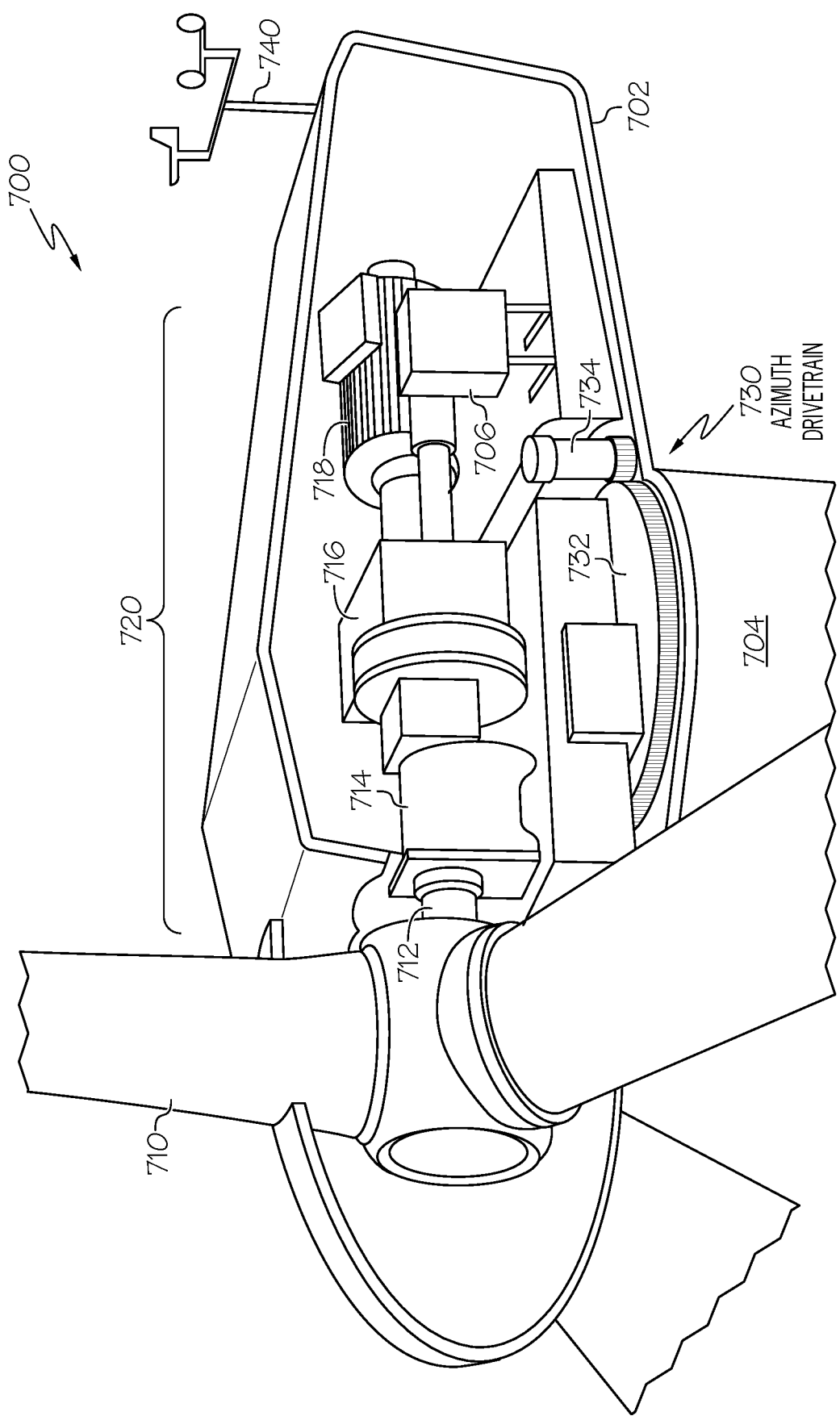
FIG. 7 illustrates components contained within an example wind turbine nacelle, according to an example.

FIG. 7 illustrates components contained within an example wind turbine nacelle 700, according to an example. The components contained within an example wind turbine nacelle 700 depict a nacelle 702 of a wind turbine. The nacelle 702 in this example is mounted on top of a tower 704. A rotor 710 is mounted on the front of the nacelle 702. The rotor 710 converts wind energy into rotational motion and drives a main shaft 712 to ultimately turn an electrical generator 718. The main shaft 712 in this example is supported by a main bearing 714 that is located near the rotor 710. The shaft 712 extends through the main bearing 714 to a gearbox 716. The gearbox 714 converts the rotational motion created by the rotor 710 to a speed suitable to properly drive the electrical generator 718. In the illustrated example, the main shaft 712, the main bearing 714, and the gearbox 716 are all components of a main drivetrain 720 of the wind turbine.

Electrical energy produced by the electrical generator 718 is delivered to an electrical transmission or distribution grid (not shown). The operations of the components in the nacelle 702 is controlled at least in part in this example by control electronics 706 that are located within the nacelle 702. In various examples, operations of components in the nacelle 702 are at least on part controlled by controller equipment located remotely from the nacelle 702.

Proper operation of a wind turbine is achieved by rotating the nacelle 702 to keep the plane of the blades of rotor 710 positioned in a direction that is perpendicular to the direction if oncoming wind. In an example, the nacelle includes wind measurement equipment 740 to support properly orienting the rotor 710 into the oncoming wind. In further examples, wind measurement equipment that is not located on the nacelle produces wind direction information to properly direct the rotor into the oncoming wind.

The illustrated nacelle 702 controls the azimuth direction of the nacelle, and thus the direction in which the rotor 710 is pointed, via an azimuth drivetrain 730. The azimuth drivetrain 730 in the illustrated example includes an azimuth drive motor 734 that engages a ring gear 732. The ring gear 732 in this example is affixed to the top of the tower 704.

Activation of the azimuth drive motor 734 causes the nacelle 702 to rotate about the tower 704 and thus reposition the face of rotor 710.

In some examples, wear of the azimuth drivetrain causes variations in the azimuth pointing direction of the nacelle 702. For example, wear of gear teeth on one or both of the ring gear 732 or the output shaft of the azimuth drive motor 734 will cause lash angles that allow the nacelle to move about the azimuth axis from the azimuth position commanded by the wind turbine controller. Further, missing teeth from either or both of the ring gear 732 or the output shaft of the azimuth drive motor 734 will cause even larger azimuth variations.

The variation in azimuth pointing angle for the nacelle 702, and rotor 710, in some examples results in the rotor 710 exerting excessive forces on components of the main drivetrain 720 of the wind turbine that the main drivetrain 720 is not designed to support. In general, these undesired forces affect the main shaft 712, main bearing 714 and gearbox 716. It has been observed that the excessive forces exerted on the main drivetrain 720 are mainly borne by the gearbox 716 and misalignment between the rotor 710 and oncoming wind may accelerate wear or damage to the gearbox 716.

It has been observed that azimuth variations caused by wear of the azimuth drivetrain 730 can cause damage to the main drivetrain 720 that is often reflected in damage to the gearbox 716. The below systems and methods correlate observed damage to the gearbox 716, as well as other components of the main drivetrain 720, with observed azimuth variation data values. Because of the correlation between azimuth variation and subsequent damage to components of the main drivetrain 720, the below described systems and methods attempt to predict upcoming damage to the main drivetrain based on observed azimuth variation data values. Further, the degree of damage to the azimuth drivetrain 730 is also estimated based upon historically observed correlations between observed values of azimuth variations and observed damage to the azimuth drivetrain 730.

In normal operations, wind turbines normally operate in a manner where the wind turbines may have some level of varying azimuth motion around a desired azimuth set point angle. It has been noted that accelerated damage to components of the main drivetrain 720, which couples the rotor 710 to the generator 718, the azimuth drivetrain 730 and other components of the wind turbine can occur if wear of the azimuth drivetrain components is not detected and maintenance is not performed to repair or replace the worn components.

The characteristics of variation in azimuth pointing of a wind turbine with worn azimuth drivetrain components tend to increase over time even in steady wind conditions. These characteristics of variation in azimuth pointing angle around a particular azimuth set point are collectively referred to herein as azimuth variation characteristics. In some examples, azimuth variation characteristics include, but are not limited to, the azimuth variation frequency or time period (of oscillation around a central pointing angle), azimuth variation speed (related to period but might have non-sinusoidal rotational speed profiles), azimuth variation distance (in degrees from the central pointing angle, sometimes expressed as a standard deviation value) and amount of azimuth variation (e.g., constant or decaying with time) are characteristics of the oscillating azimuth motion that have been observed to increase with azimuth drivetrain wear.

An increase in azimuth variation values may precede occurrences of damage to or failure of the main drivetrain of a wind turbine. The below described systems and methods utilize historically observed correlations between values of azimuth variation characteristics and main drivetrain wear and damage to uses presently observed azimuth variation characteristics to preemptively estimate likely occurrences of upcoming main drivetrain wear or damage.

The below described systems and methods, in an example, accumulate azimuth variation characteristics data for a large number of wind turbines over various periods of time. The accumulated azimuth variation characteristics data allows determination of, for example, azimuth variation frequency or time period, azimuth variation speed, azimuth variation distance, amount of azimuth variation, other azimuth variation related characteristics, or combinations of these. In an example, this data is collected into data sets that contain data measured over a number of determined different time intervals and the data from each of those time intervals is stored for analysis. Such time periods for the collection of data sets are able to be any suitable length of time, such as one (1) hour, (1) month, longer time periods or shorter time periods. Data accumulated during each of these time periods is analyzed to identify clusters of values in the data that comprise these data sets. These different clusters of values in the data have been observed to correspond to different amounts of azimuth drivetrain wear.

In an example, an analysis of long term wind turbine azimuth variation characteristics indicates that normal operations of a particular type of wind turbine exhibit a mean azimuth variation speed of less than 0.0025 degrees/minute, an azimuth variation speed standard deviation of less than 18 degrees at a 1 minute interval, and an accumulated azimuth variation time within 365 days of less than 1200 hours (which is equivalent to a total time of fifty (50) 24 hour days). In such an example, these values are considered to be a "normal azimuth variation characteristics value threshold" and if any of these azimuth variation characteristics quantities that are measured for a wind turbine of that type exceed these values, an alert or other action is initiated.

In some examples, actions that can be taken in response to detecting that azimuth variation characteristics data for a particular wind turbine exceeds a threshold include, but are not limited to, recommending or initiating a visit to the particular wind turbine that is reporting such azimuth variation characteristics data. Continuing with this this example, damage to the azimuth drivetrain is suspected if the azimuth variation characteristics are determined to be above a "damage value threshold," which analysis in one example has determined that, for a particular type of wind turbine, corresponds to a mean azimuth variation speed that is above 0.007 degrees per minute and a azimuth variation speed standard deviation that is above 20 degrees within one minute intervals for over 3000 hours. Detecting azimuth variation characteristics values that exceed the damage value threshold is able to cause an alert or other action to be initiated indicating that the azimuth drivetrain for the wind turbine reporting that value is likely damaged. By determining the likely damage to the azimuth drivetrain of a wind turbine, remedial action is able to be made before damage to the main drivetrain occurs.

In some examples, as is described in further detail below, the wind turbines operate with different control modes based on the present wind speed at the wind turbine. In some of the below described examples, the wind speeds in which a wind turbine is able to operate is divided into a number of ranges where each range corresponds to different control modes for the wind turbine. In an example, each of these wind speed ranges defines a wind speed "bin" and accumulated azimuth variation characteristics data is associated with the bin that corresponds to the wind speeds that was present when that data was measured.

The accumulated azimuth variation characteristic data in an example is then combined with maintenance data for those wind turbines to determine correlations between the clusters of values of the azimuth variation characteristics and observed maintenance actions. In some examples, levels of damage to components of the main drivetrain, which is the drivetrain coupling the rotor to the electrical generator of the wind turbine, wear or damage to the azimuth drivetrain, or associated maintenance actions are correlated to values of azimuth various characteristics that are observed prior to those maintenance actions. In various examples, maintenance data is able to contain information that indicates any type of maintenance action that is performed on particular wind turbines. Such maintenance actions in an example include any action that indicates a repair, adjustment, other action, or combinations of these, that are related to wearing of components of the main drivetrain or the azimuth drivetrain for a wind turbine. For example, azimuth variation characteristics data collected for a particular wind turbine during a time period before one or more maintenance actions on that particular wind turbine is determined to be correlated with those maintenance actions and therefore those one or more maintenance actions are considered to be associated with clusters of values containing that azimuth variation characteristics data.

In an example, respective conditions of the azimuth drivetrain of a particular wind turbine are determined and associated with each of the various maintenance activities that are reported in the maintenance data. For example, processing may determine that a set of anomalous azimuth variation characteristics data was measured for a particular wind turbine prior to a reported maintenance action that repaired damage on a component of the main drivetrain 720 of a particular wind turbine, such as a particular level of damage to the gearbox 716 of that wind turbine. This processing associates that particular level of damage to the gearbox 716 of the main drivetrain 720 with data values in a cluster containing that set of anomalous azimuth variation characteristic values. Based on that association, a condition of the particular level of damage to the gearbox 716 of the wind turbine is able to be a condition that is determined to be associated with the main drivetrain 720 of a particular wind turbine that reports azimuth variation characteristics that are in or near the cluster that contains that set of anomalous azimuth variation characteristic values.

In another example, processing may determine that a set of anomalous azimuth variation characteristics data was measured for a particular wind turbine prior to a reported maintenance action that repaired damage on the azimuth drivetrain 730 of a particular wind turbine. This processing associates damage of the azimuth drivetrain 730 with data values in a cluster containing that set of anomalous azimuth variation characteristic values. Based on that association, a condition of damage of the azimuth drivetrain 730 of the wind turbine is able to be a condition that is determined to be associated with the azimuth drivetrain 730 of a particular wind turbine that reports azimuth variation characteristics that are in or near the cluster that contains that set of anomalous azimuth variation characteristic values.

These scenarios are examples of receiving, subsequent to associating the respective condition, a measured set of azimuth variation characteristics data; determining an identified cluster with values of azimuth variation characteristics data that corresponds to values in the measured set of azimuth variation characteristics data for a subject azimuth drivetrain; and determining that a respective condition associated with the identified cluster of values is a subject condition associated with one of the subject main drivetrain or the subject azimuth drivetrain. This condition is then able to be reported as the subject condition of the one of the subject main drivetrain or the subject azimuth drivetrain.

In an example, the azimuth variation characteristics and maintenance data associated with wear or damage to one of the main drivetrain, the azimuth drivetrain, or both, are analyzed by processing with a machine learning processes, such as processes incorporating various artificial intelligence techniques, to identify clusters and the correlation of each of those clusters with wear or damage levels of the main drivetrain, the azimuth drivetrain, or both. In some examples, processing of the azimuth variation characteristics data with an unsupervised learning process to identify clusters of values within the azimuth variation characteristics data is able to include unsupervised learning processes that include density based methods to identify clusters, hierarchical based methods to identify clusters, partitioning methods to identify clusters, grid-based methods to identify clusters, other methods, or combinations of these. Associating maintenance actions with clusters is able to include processing that incorporates, for example, unsupervised data mining techniques such as association rule learning, which may also be referred to as association rule mining, to identify relationships between clusters of values in accumulated data and maintenance actions.

In some examples, monitoring systems incorporating machine learning, such as artificial intelligence techniques, is trained by using a set of historically accumulated monitoring data. In one example, a large data set containing historical damage or failure records and operational data that was accumulated over a time period of more than ten years from over 10,000 wind turbines was used to develop and train machine learning monitoring systems to detect excessive azimuth drivetrain wear. This data set was also used to validate the correlation and causation between azimuth variation behaviors and wear or damage levels to the main drivetrain, the azimuth drivetrain, or both.

In an example, the artificial intelligence process takes three continuous data inputs: (1) nacelle orientation position, (2) wind speed, and (3) active output electrical power from the wind turbine. The artificial intelligence process in an example also receives a binary input that indicates whether the azimuth controller for the wind turbine is executing a cable untwist command. The cable untwist command is used to cause the nacelle of the wind turbine to rotate in one or more complete circles to unwrap cables that have twisted due to rotation of the nacelle in full circles to follow the direction of the wind.

Each of the three continuous inputs in an example is able to be provided at 45 samples per minute based on the sensor types. In an example, the artificial intelligence process then aggregates the data into one-hour windows and analyzes the statistical distribution of the inputs. The average speed and variances of the azimuth movement measurements are calculated in an example and then mapped into different wind speed bins to reflect different azimuth variation characteristics in each of the different wind speed bins.

Once an artificial intelligence based azimuth drivetrain wear monitoring system is developed and trained, observed data from operating wind turbines is received and processed by these systems to identify whether that observed data indicates that a maintenance action is likely to be required for a particular wind turbine. Further, a closed loop processing infrastructure is developed to feed maintenance actions for the main drivetrain, the azimuth drivetrain, or both, from the field back into the system to continuously improving the training and accuracy of the system.

In some examples, the values in the clusters of values determined for accumulated azimuth variation characteristics data, models developed by machine learning algorithms, other techniques, or combinations of these, are able to be compared to presently measured azimuth variation characteristics for a particular azimuth drivetrain 730 to determine whether that particular azimuth drivetrain 730 is worn or damaged and whether damage to the main drivetrain 720 is likely to be induced by such wear or damage. In some examples, the below described systems and methods identify clusters of azimuth variation characteristics data values that are associated with worn or damaged main drivetrains 720, worn or damaged azimuth drivetrains 730, or both. Based on comparison of presently measured azimuth variation characteristics values to the values in these clusters, a determination can be made as to whether that particular azimuth drivetrain 730 is worn or damage, whether damage to that particular azimuth drivetrain 730 is likely to induce damage to the main drivetrain 720 of that wind turbine, whether other maintenance actions may be required, or combinations of these.

Detection of whether a particular azimuth drivetrain 730 is worn or damaged allows maintenance or repairs to be scheduled based on received measured azimuth variation characteristics. In particular, detecting wear or damage to an azimuth drivetrain 730 that is likely to lead to excessive azimuth variations and damage to be main drivetrain 720 of the wind turbine allows maintenance actions, (e.g., repairs) to be conducted prior to the occurrence of damage to the main drivetrain 720, prior to damage of the azimuth drivetrain 730, or both. In some examples, determining that a particular azimuth drivetrain 730 is worn indicates that the azimuth drivetrain 730 is able to be maintained or repaired with less intensive and less costly repairs than in if the azimuth drivetrain 730 were damaged. In various examples, detection that the azimuth drivetrain 730 is worn allows more minor, more cost efficient repairs to be made "up-tower" by repair crews that climb the tower to perform the repairs. Further, if azimuth drivetrain wear is detected before the azimuth drivetrain 730 is damaged, measured azimuth variation data is able to be monitored to determine a rate of wear of the azimuth drivetrain 730.

Based on the determined rate of wear, and potentially other data, a time at which the azimuth drivetrain 730 can be repaired is able to be more flexibly selected than if the azimuth drivetrain 730 is damaged. For example, a projected remaining life of the azimuth drivetrain 730 before it is damaged, or before degradation or damage occurs to the main drivetrain 720, is able to be estimated based on the time progression of degradation in the measured azimuth variation characteristics data. Based on the projected remaining life of the azimuth drivetrain 730 or until damage to the main drivetrain 720 occurs, repairs or maintenance are able to be scheduled to occur before the end of the projected remaining life of the azimuth drivetrain 730 or before damage to the main drivetrain 720 occurs, but at times that coincide with other operational considerations such as times of lower electric power generation requirements for the wind turbine, times when other maintenance or repairs are scheduled for that or nearby wind turbines, other considerations, or combinations of these.

In an example, the below described systems and methods are able to be implemented in a dongle like hardware device that can be applied to the azimuth controllers provided by various manufacturers for the wind turbines installed in any wind farm. In an example, the system is able to be designed to be self-configurable and to operate to automatically update its operating parameters based on the operational conditions of the wind farm.

Figure 1:
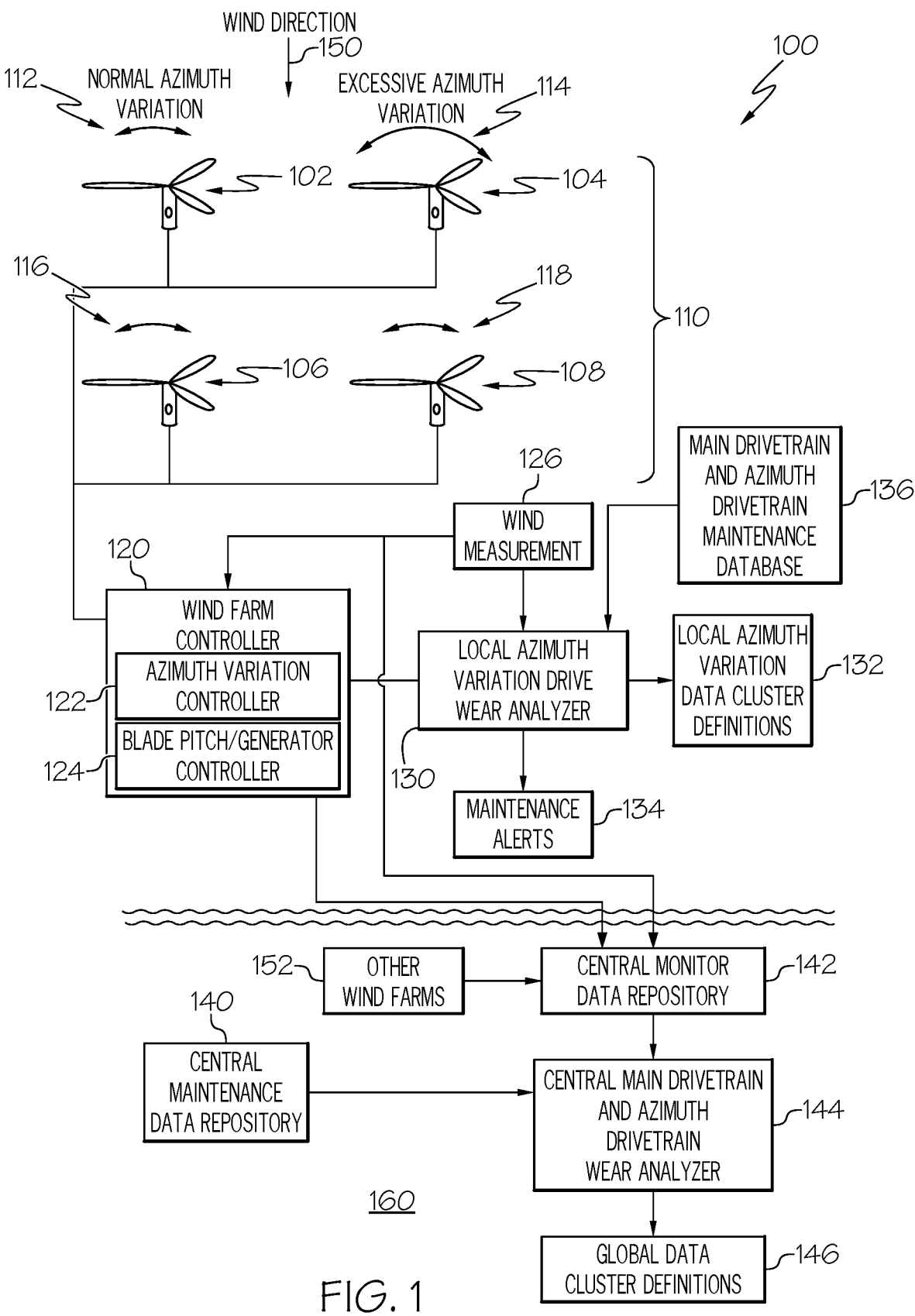
FIG. 1 illustrates an example wind turbine azimuth drive wear monitoring system, according to an example.

FIG. 1 illustrates an example wind turbine azimuth drive wear monitoring system 100, according to an example. The illustrated example wind turbine azimuth drive wear monitoring system 100 depicts a group of wind turbines 110 that represents a wind farm. The illustrated group of wind turbines 110 includes four wind turbines, a first wind turbine 102, a second wind turbine 104, a third wind turbine 106, and a forth wind turbine 108. The illustrated group of wind turbines 110 shows four wind turbines that are arranged in a square pattern in order to simplify the description of relevant aspects of the below described systems and methods. In general, a wind farm is able to have any number of wind turbines that are located in any arrangement relative to one another.

The example wind turbine azimuth drive wear monitoring system 100 shows the present wind direction 150 with the wind coming from the top of the illustration. Each of the illustrated wind turbines depicts a respective azimuth variation range that indicates the range of azimuth motion of each wind turbine around its specified azimuth set point. The first wind turbine 102 is indicated to have a first azimuth variation range 112, which in this example is a normal azimuth variation. The second wind turbine 104 is indicated to have a second azimuth variation range 114, which in this example is an excessive azimuth variation range. The third wind turbine 106 is indicated to have a third azimuth variation range 116 and the fourth wind turbine 108 is indicated to have a fourth azimuth variation range 118. The third azimuth variation range 116 and fourth azimuth variation range 118 in this example are normal azimuth variation ranges.

The example wind turbine azimuth drive wear monitoring system 100 depicts a wind measurement system 126 that is associated with the wind farm that includes the illustrated group of wind turbines 110. The wind measurement system 126 in an example measures wind speed and direction in order to support proper operation of the wind turbines in its associated wind farm. In various examples, the wind measurement system is able to consist of any number of components, such as a single wind speed/direction measurement device, a number of wind speed and direction measurement devices that are distributed around the associated wind farm, wind speed and direction measurement equipment located at or on each or some of the wind turbines in the wind farm, other arrangements, or combinations of these. When wind direction measurement equipment is located on the nacelle of a wind turbine, the excessive azimuth variation or oscillation conditions may be exasperated by a feedback system where excessive azimuth movements of the nacelle cause the wind direction measurement equipment to incorrectly determine changes in wind direction. The feedback system may produce azimuth corrections as the system responds to measured changes in wind direction resulting from excessive azimuth movement of the nacelle and the corresponding movement of the nacelle's wind direction measurement equipment, rather than actual changes in wind direction.

In general, the misalignment of the wind turbine with the oncoming wind causes unnecessary forces to be exerted on components of the wind turbine. Such misalignment in various examples causes increased aerodynamic lift and drag forces to be exerted on the blades of the wind turbine. Such misalignment can also exert unnecessary forces on various components of the wind turbine such as on components of the main drivetrain that include the rotor, main bearing, main shaft, the gear box, other components, or combinations of these. In some examples, the gear box that connects the main shaft to the electrical generator of a wind turbine is often subjected to increased forces due to the wind turbine being misaligned with the wind and thus may be subject to increased instances of damage as the azimuth drivetrain wears and the azimuth variation values increase.

The example wind turbine azimuth drive wear monitoring system 100 depicts a wind farm controller 120. A central wind farm controller 120 is depicted in this example to simplify the description of relevant components of the presently described systems and methods. In various examples, the wind farm controller 120 is able to include a single controller device, include controller components that are distributed across all or some of the wind turbines, include one or more controller systems with any suitable architecture, or combinations of these. The wind farm controller 120 in this example is in electrical communication with each wind turbine at the windfarm that includes the group of wind turbines 110. The illustrated wind farm controller 120 is shown to have an azimuth controller 122 and a blade pitch/generator controller 124. The azimuth controller 122 determines a desired azimuth set point for each wind turbine based on, for example, the present wind speed and direction as reported by the wind measurement system 126. The blade pitch/generator controller 124 in an example controls the pitch of the blades in each wind turbine and also operating parameters of the electrical generator in each wind turbine in order to maximize the electrical output power produced by each wind turbine for the particular wind conditions as reported by the wind measurement system 126.

The example wind turbine azimuth drive wear monitoring system 100 includes a local azimuth drive wear analyzer 130. The local azimuth drive wear analyzer 130 implements processing of measured data, such as azimuth data, wind speed data, other relevant data, or combinations of these, in order to monitor azimuth drive performance and wear. The local azimuth drive wear analyzer 130 in an example implements the processing described below to characterize azimuth drive wear based on observed azimuth variations, determine likely wear of azimuth drive components, determine values of azimuth variation data that have been observed to precede or occur with damage to components of the main drivetrain of the wind turbine, and alert personnel to perform maintenance prior to damage of the main drivetrain or the need for more extensive repairs of the azimuth drivetrain.

The example wind turbine azimuth drive wear monitoring system 100 includes a main drivetrain and azimuth drivetrain maintenance database 136. The main drivetrain and azimuth drivetrain maintenance database 136 in an example stores maintenance and repair histories for both the main drivetrain and the azimuth drivetrain of each wind turbine in the group of wind turbines 110. In an example, the local azimuth drive wear analyzer 130 analyzes accumulated azimuth variation data for each wind turbine in conjunction with maintenance activity for one or both of the main drivetrain or the azimuth drivetrain for that particular wind turbine.

The local azimuth drive wear analyzer 130 in an example analyzes accumulated data to determine azimuth variation data value clusters that are each associated with normal operations or operations indicative of excessive wear of the azimuth drive components. Local azimuth drive wear analyzer 130 in an example, determines clusters of azimuth data values, associates maintenance actions as provided by the main drivetrain and azimuth drivetrain maintenance database 136 for each wind turbine with each cluster observed for that wind turbine, and identifies clusters of azimuth variation data values that are likely to indicate potential wear or upcoming damage to one or more components in at least one of the main drivetrain or the azimuth drivetrain. In some examples, by determining values of azimuth variation data that have been observed to precede damage to the main drivetrain of a wind turbine, maintenance or repair of the azimuth drivetrain is able to be performed when those values are observed and thus before damage occurs to components of the main drivetrain, to components of the azimuth drivetrain, to other components, or to combinations of these.

As is described in further detail below, some wind turbines have different control phases that are determined by the present wind speed at the wind turbine. In an example, the received data is segregated into groups associated with the different control phases for the wind turbines. In such an example, the identification of clusters of values and association with maintenance actions is performed separate for each group of data associated with the control phases of the wind turbines.

The example wind turbine azimuth drive wear monitoring system 100 depicts a local azimuth variation data cluster definition storage 132. The local azimuth variation data cluster definition storage 132 in an example stores cluster definitions as are determined by processing performed by the local azimuth drive wear analyzer 130.

The local azimuth drive wear analyzer 130 in an example is able to provide notifications of likely excessive wear of azimuth drive components. The example wind turbine azimuth drive wear monitoring system 100 depicts a maintenance alerts function 134 that is able to provide maintenance alerts to maintenance personnel based on determinations made by the local azimuth drive wear analyzer 130. In an example, the maintenance alerts function 134 is able to create a work order to perform maintenance actions to correct excessive azimuth variations that can result in increased forces being applied to the main drivetrain of the wind turbine, and to thus cause a work crew to be dispatched to perform such maintenance actions.

The example wind turbine azimuth drive wear monitoring system 100 depicts a central processing system 160. In alternative examples, a wind turbine azimuth drive wear monitoring system is able to consist of the above described equipment that monitors a single wind farm. In some examples, the central processing system 160 receives operational data from multiple wind turbines of one type or of different types and designs where these multiple wind turbines that may or may not be located across multiple wind farms in different geographical locations. The central processing system 160 in an example is able to accumulate operational data, such as wind speed and direction measurements, azimuth data, other data, or combinations of these, along with maintenance data for each wind turbine in the multiple wind turbines for which data is accumulated. The central processing system 160 in an example is able to perform processing to support the identification of characteristics that indicate excessive wear of the azimuth drivetrain components, values of azimuth variation data that precede damage to the main drivetrain of wind turbines, or both.

In the illustrated example, the central processing system 160 incudes a central monitor data repository 142. The central monitor data repository 142 in an example receives operational data for a number of wind turbines that are able to be located at any number of various wind farms. The central monitor data repository 142 in an example receives measured wind speed and direction data that is associated with each wind turbine for which data is received, azimuth measurement data for each wind turbine, other data, or combinations of these.

The depicted central processing system 160 also includes a central maintenance data repository 140. The central maintenance data repository in an example includes maintenance data, including damage reports and maintenance actions for repairs to components of the main drivetrain and azimuth drivetrains of each wind turbine for which data is received. In general, a central processing system 160 is able to receive maintenance data for each wind turbine by any suitable technique, such as by accessing various maintenance records for the various wind farms from which data is received.

The central processing system 160 also includes a central azimuth drive wear analyzer 144. The central azimuth drive wear analyzer 144 in an example performs similar processing as the above described local azimuth drive wear analyzer 130 but processes data from a large number of wind turbines that are able to be located at multiple wind farms. The central azimuth drive wear analyzer 144 in an example, determines clusters of azimuth data values that are segregated by different control phases for the wind turbines, associates maintenance actions for each wind turbine, such as maintenance and damage reports for components of the main drivetrain, the azimuth drivetrain, or both, with each cluster observed for that wind turbine, and identifies clusters of values that are likely to indicate upcoming damage to components of the main drivetrain, excessive wear, damage, or failure of azimuth drivetrain components in the near future, or combinations of these.

The central azimuth drive wear analyzer 144 in an example produces global azimuth data cluster definitions 146. The global azimuth data cluster definitions are similar to the above described local azimuth data cluster definition storage 132. In an example, processing the data accumulated in the global azimuth data cluster definitions 146 supports analyzing azimuth variation data for various wind turbines to estimate when azimuth variations for a particular wind turbine at any location may have a magnitude to cause damage to the main drivetrain of that wind turbine.

Figure 2:
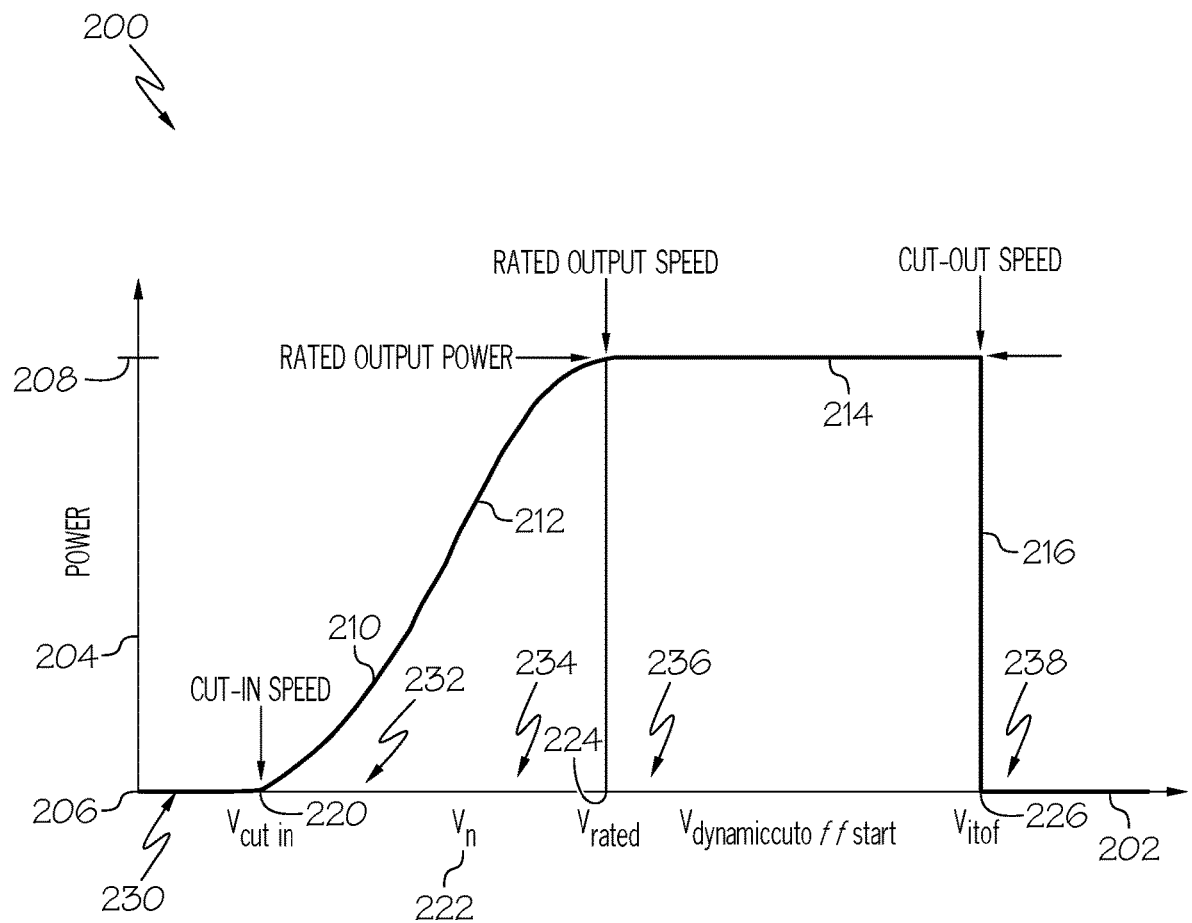
FIG. 2 illustrates a wind turbine control phase diagram, according to an example.

FIG. 2 illustrates a wind turbine control phase diagram 200, according to an example. In an example, wind turbine controllers define a number of control phases that are defined by the present wind speed at the wind turbine. In each control phase, the controller implements different control algorithms to maximize the electrical power produced by the wind turbine. In an example, azimuth variation data that is collected or analyzed is segregated according to the control phase in which the controller of the wind turbine is operating. Data collected in each of the illustrated control phases is then analyzed to identify clusters of values and correlations with maintenance actions.

The wind turbine control phase diagram 200 includes a steady wind speed axis 202 along the horizontal direction, and an output power axis 204 along the vertical direction. The output power axis 204 in this example indicates the electrical power produced by a wind turbine. The output power axis 204 includes a zero value 206 and a rated output power value 208. The rated output power value 208 indicates the maximum rated output electrical power that can be produced by the wind turbine.

The steady wind speed axis 202 includes five values, the zero value 206, a cut-in speed value 220, a transition speed value 222, a rated output speed 224, and a cut-out speed 226. These for wind speed values define four wind speed ranges, a pre-cut-in wind speed range 230, a cut-in speed range 232, a transition speed range 234, a full power speed range 236, and a cut-out speed range 238. In each of these wind speed ranges, the above described wind farm controller 120 implements different operating control algorithms to protect the wind turbine or maximize the electrical power produced by the wind turbine.

In the pre-cut-in wind speed range 230, the wind speed is below the cut-in speed value 220 and the wind turbine is not generating appreciable electrical power. In the pre-cut-in wind speed range, the azimuth controller does not turn the wind turbine into the wind direction. In an example, the azimuth controller is able to turn the nacelle to untwist cables.

In the cut-in speed range 232, the wind farm controller 120 causes the wind turbine to face a direction corresponding to the present wind direction or in a desired direction that is determined based on the present wind direction. The wind farm controller 120 also controls the rotor speed, such as by controlling the electrical generator, to maximize the energy produced by the wind turbine for the present wind speed. A cut-in wind speed power output curve 210 depicts output power vs wind speed in the cut-in speed range 232.

In the transition speed range 234, the wind farm controller 120 causes the wind turbine to face a direction corresponding to the present wind direction or in a desired direction that is determined based on the present wind direction. The wind farm controller 120 transitions from controlling the rotor speed by controlling the electrical generator to controlling blade pitch in order to maximize the energy produced by the wind turbine for the present wind speed. A transition wind speed power output curve 212 depicts output power vs wind speed in the transition speed range 234.

In the full power speed range 236, the wind farm controller 120 causes the wind turbine to face a direction corresponding to the present wind direction or in a desired direction that is determined based on the present wind direction. The wind farm controller 120 causes the wind turbine to produce full rated power by controlling blade pitch. A full power wind speed power output curve 214 depicts constant output power value 208 vs wind speed in the full power speed range 236.

In the cut-out speed range 238, the wind speed exceeds the maximum safe speed for operation of the wind turbine and the wind farm controller 120 causes the wind turbine to stop turning, thereby causing the cut-off output power 216 to drop to the zero value 206.

Figure 3:
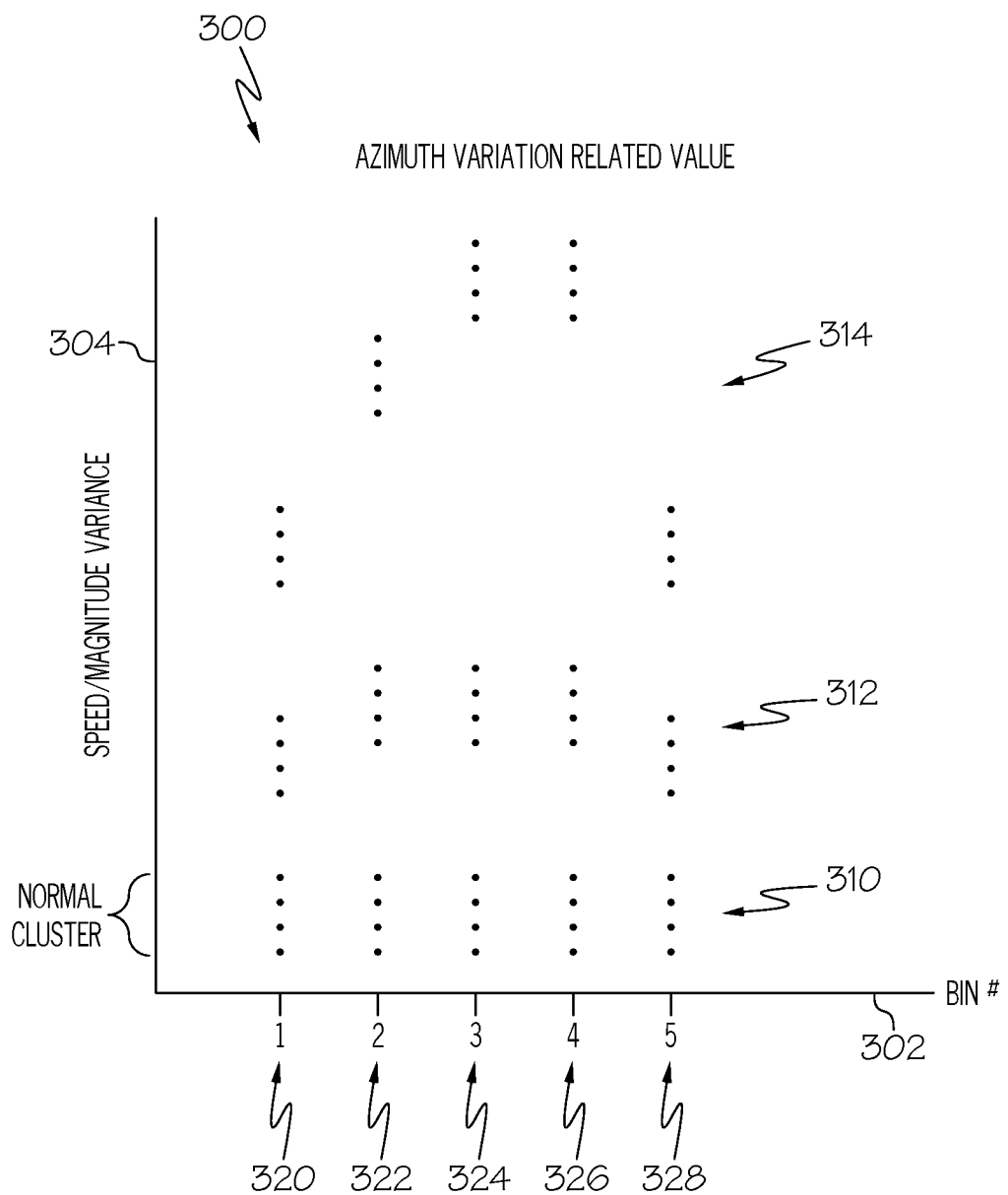
FIG. 3 illustrates a azimuth variation data set clustering graph, according to an example.

FIG. 3 illustrates an azimuth variation data set clustering graph 300, according to an example. In the illustrated example, the azimuth variation data set clustering graph 300 depicts example sets of azimuth variation characteristics data that have been collected for a large number of wind turbines over a long period of time. In various examples, the azimuth variation data set clustering graph 300 depicts any suitable set of measured values for a particular azimuth variation characteristic, such as, azimuth variation frequency or time period, azimuth variation speed, azimuth variation distance (expressed as, e.g., a standard deviation of azimuth movement around an azimuth set point), amount of azimuth variation, other azimuth variation related characteristics, or combinations of these.

The azimuth variation data set clustering graph 300 depicts that the data has been gathered into a number of bins, where each bin corresponds to a wind speed range that corresponds to a different control phase in operation when the data was collected. As described above, a wind turbine controller generally operates in one of five control phases, where the present control phase is determined by the currently observed wind speed present at the wind turbine.

The azimuth variation data set clustering graph 300 depicts a horizontal control mode bin axis 302 and a vertical value axis 304. The control mode bin axis 302 depicts in which control mode the wind turbine controller is operating when the data along the vertical axis is measured. The value axis 304 depicts the values of the particular azimuth variation characteristics. As discussed above, the values and example units for these values are able to be azimuth variation frequency or time period (in cycles/second or seconds), azimuth variation speed (in degrees per second), azimuth variation distance (in standard deviation of degrees), amount of azimuth variation (in degrees), other related characteristics, or combinations of these.

The azimuth variation data set clustering graph 300 depicts accumulated azimuth variation characteristics values that are grouped into five (5) bins. The control mode bin axis 302 includes markers for a bin 1 320, a bin 2 322, a bin 3 324, a bin 4 326, and a bin 5 328. Above each of these markers are the respective measured values that have been accumulated for wind turbines when their controllers are operating in each of these modes.

The azimuth variation data set clustering graph 300 depicts normal clusters 310. The normal clusters 310 in an example are clusters of values that include values that are below a threshold value for the particular azimuth variation characteristic value, such as azimuth variation frequency or time period, azimuth variation speed, azimuth variation distance, amount of azimuth variation, other azimuth variation related characteristics, or combinations of these. In some examples, this threshold is determined based on analysis of an accumulation of data which may or may not also incorporate maintenance data for the wind turbine. In further examples, machine learning techniques are used to identify clusters of data values that are determined to reflect normal operations.

The azimuth variation data set clustering graph 300 depicts a number of clusters of values with values above normal clusters 310. A first abnormal set of data clusters 312 are depicted has having values above the normal cluster 310 in each of the five (5) bins along the control mode bin axis 302. A second abnormal set of data clusters 314 are also depicted that have values above those of the first abnormal set of data clusters 312 in each of the five (5) bins. In an example, each set of abnormal data clusters is able to be collected from one or more wind turbines that have different maintenance issues, pending or present main drivetrain component damage, azimuth drive malfunctions, or combinations of these. For example, the first abnormal set of data clusters 312 is able to indicate the that azimuth variation characteristics are above a normal azimuth variation characteristics value threshold, such as is described above, and that a maintenance visit would be recommended to such a wind turbine exhibiting such azimuth variation characteristics. Continuing with that example, the second abnormal set of data clusters 314 is able to indicate values that are above a damage value threshold, as is also described above, and thus indicate likely damage to the azimuth drive train of the wind turbine.

Figure 4:
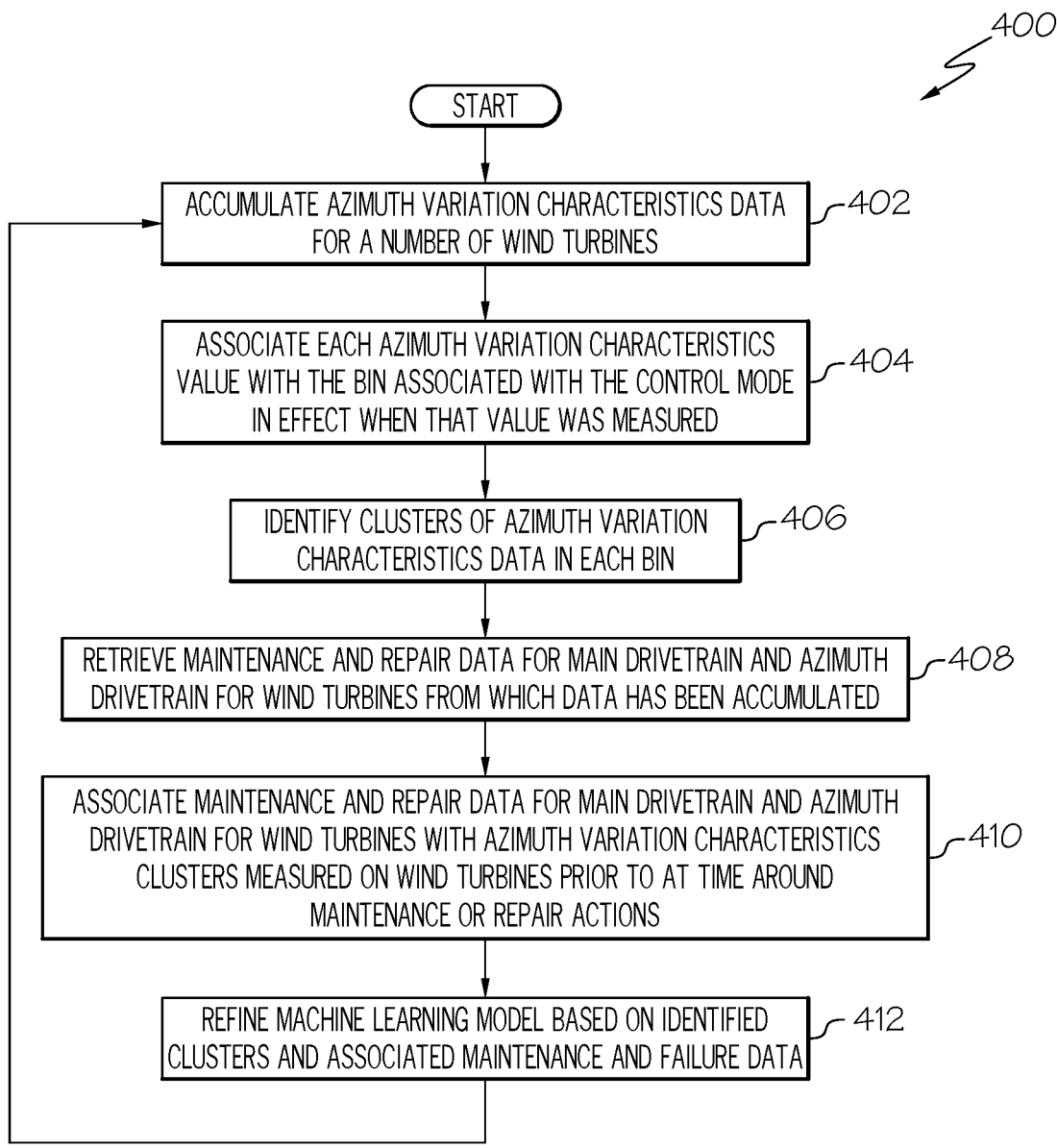
FIG. 4 illustrates an azimuth drive monitor training process, according to an example.

FIG. 4 illustrates an azimuth drive monitor training process 400, according to an example. Referring to the example wind turbine azimuth drive wear monitoring system 100 discussed above, the azimuth drive monitor training process 400 is an example of a process executed by the local azimuth drive wear analyzer 130 or the central azimuth drive wear analyzer 144 that trains a machine learning based model to identify azimuth variation characteristics that are likely to indicate abnormal behavior, upcoming or present damage to main drivetrain components of the wind turbine, damaged azimuth drive components of the wind turbine, or combinations of these. The azimuth drive monitor training process 400 is an example of a process performed by a model building engine to train a machine learning model that includes at least some of the below elements.

The azimuth drive monitor training process 400 accumulates, at 402, azimuth variation characteristics data for a number of wind turbines. In various examples, the azimuth variation characteristics data is able to be a plurality of azimuth variation characteristics data that is for a particular type or model of wind turbine, or for a number of disparate types or models of wind turbines. In some examples, the accumulation of azimuth variation characteristics data for a particular wind turbine includes receiving periodically measured values of, for example, azimuth pointing data for that particular wind turbine and calculating particular azimuth variation characteristics such as azimuth variation frequency or time period, azimuth variation speed, azimuth variation distance, amount of azimuth variation, other azimuth variation related characteristics, or combinations of these, based on the periodic azimuth measurements. The azimuth variation characteristics data, or the data used to determine the azimuth variation characteristics data, is received in an example from one or more of the wind farm controller 120, the central monitor data repository 142, other data repositories, or combinations of these.

The azimuth drive monitor training process 400 associates, at 404, each azimuth variation characteristics value with the bin associated with the control mode in effect when that value was measured. As described above, wind turbine controllers operate in different control modes based on the measured wind speed that is present at the wind turbine. In an example, azimuth variation characteristics data is separated into different bins where each bin corresponds to a different control mode for that wind turbine. The bin to which each data measurement is to be associated is able to be determined by any suitable technique, such as receiving an indication of the control mode from the wind farm controller 120, determining the control mode based upon wind measurement data received from the wind measurement system 126, any other technique, or combinations of these. In an example, a respective control mode indication within a plurality of control modes of at least one wind turbine that was in effect during measurement of the each respective value within the plurality of azimuth variation characteristics data is received in association with each respective value within the plurality of azimuth variation characteristics data.

The azimuth drive monitor training process 400 identifies, at 406, clusters of azimuth variation characteristics values in each bin. The identification of data clusters, which in an example are clusters of data with values that are within a threshold value of each other, is able to be achieved by any suitable technique as is understood by practitioners in the fields of data analysis, data mining, machine learning, and other fields. In an example, data clusters are separately identified in each data bin.

The azimuth drive monitor training process 400 retrieves, at 408, maintenance data for wind turbines from which data has been accumulated. In general, maintenance data is able to be retrieved from any suitable data source, such as the central maintenance data repository 140, locally stored maintenance records in the main drivetrain and azimuth drivetrain maintenance database 136, other repositories, or combinations of these. In an example, the maintenance data is able to include, for each of the wind turbines for which data is accumulated, the date and time that a particular wind turbine suffered damage, had a failure, or had maintenance of a component in its main drivetrain, damage or a failure of a component of its azimuth drivetrain, had maintenance to its azimuth drivetrain, required and had a repair of a particular component of its main drivetrain or azimuth drivetrain, or any combination of these.

The azimuth drive monitor training process 400 associates, at 410, service actions indicated in the retrieved maintenance data with clusters of azimuth variation characteristics data values measured for wind turbines that had maintenance actions. In an example, azimuth variation characteristics data clusters of values that were measured for a wind turbine prior to or at a time around a particular maintenance or repair action on that wind turbine are associated with that particular maintenance action. In such an example, a condition of such a main drivetrain is able to be indicated as being likely to have upcoming damage to the main drivetrain.

In an example, associating a particular maintenance action with a cluster of azimuth variation characteristics data allows an inference that azimuth variation characteristics data for other wind turbines that is near that data cluster is likely to indicate that the particular maintenance actions may be required for that other wind turbine. In an example, azimuth variation characteristics data clusters that were observed on a particular wind turbine prior to observed damage to components of the main drivetrain of that wind turbine are able to be associated with the subsequently observed damage and have an associated condition of likely to have upcoming damage to the main drivetrain. Further, any knowledge of the underlying causes of those maintenance actions can be inferred to be present in another wind turbine exhibiting similar azimuth variation characteristics.

The azimuth drive monitor training process 400 refines, at 412, the developed machine learning models based on identified clusters and associated maintenance and damage data. In an example, azimuth variation data is received and accumulated over time from a number of wind turbines. Maintenance and repair information for those wind turbines is also collected and accumulated of that time. Azimuth variation data that is measured prior to or around the time of maintenance or repair actions are processed by the machine learning training process to refine the machine learning based model. The refinement of the machine learning based model in an example improves predictions of future failures or damage to components of the main drivetrain, the azimuth drivetrain, other components, or combinations of these, based on observed azimuth variation data.

The azimuth drive monitor training process 400 then returns to accumulate, at 402, azimuth variation characteristics data and the subsequent processing as is described above. In an example, the definitions of clusters of values of accumulated data and their associated maintenance activities are stored in either the local azimuth variation data cluster definition storage 132, when the azimuth drive monitor training process 400 is performed by the local azimuth drive analyzer, or in the global azimuth variation data cluster definitions 146 when the azimuth drive monitor training process 400 is performed by the central azimuth drive wear analyzer 144.

In an example, training a machine learning model is able to be based upon identifying a plurality of clusters of values within the plurality of azimuth variation characteristics data. A respective condition of the wind turbine azimuth drivetrain is then associated with each cluster of values in the plurality of clusters of values. The machine learning model is then able to identify a condition of an azimuth drivetrain based on this training by processing measured sets an azimuth variation characteristics data.

Figure 5:
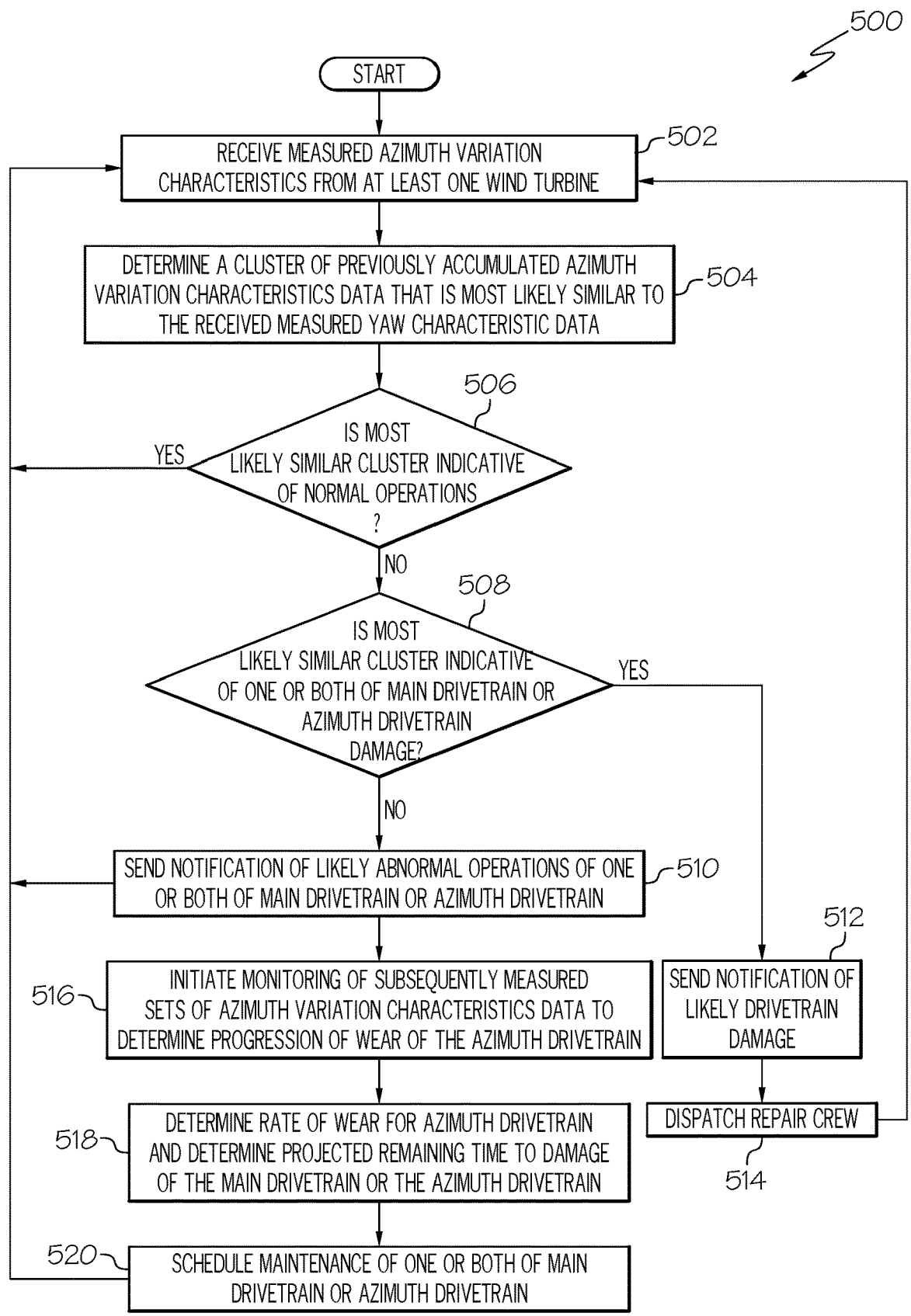
FIG. 5 illustrates an azimuth drive operations monitoring process, according to an example.

FIG. 5 illustrates an azimuth drive operations monitoring process 500, according to an example. Referring to the example wind turbine azimuth drive wear monitoring system 100 discussed above, the azimuth drive operations monitoring process 500 is an example of a process executed by the local azimuth drive wear analyzer 130 or the central azimuth drive wear analyzer 144 that receives and processes measured azimuth characteristics data to identify suspected maintenance issues, or upcoming damage to the main drivetrain or azimuth drivetrain components. The azimuth drive operations monitoring process 500 in an example operates to determine azimuth variation characteristics that are likely to indicate that damage to the main drivetrain of the wind turbine may occur if maintenance or repair of the azimuth drivetrain is not performed. In an example, the azimuth drive operations monitoring process 500 identifies such suspected issues via the use of a machine learning based model that has been trained by the above described azimuth drive monitor training process 400. The azimuth drive operations monitoring process 500 is an example of a model based monitoring engine that performs a process to perform at least some of monitor operations of the azimuth drive of a wind turbine, identify likely conditions associated with the azimuth drive based on a trained model, including conditions that are likely to lead to damage to components of the main drivetrain of the wind turbine, and reports such conditions.

The azimuth drive operations monitoring process 500 receives, at 502, a measured set of azimuth variation characteristics data from at least one wind turbine. In some examples, receiving measured azimuth variation characteristics data for a particular wind turbine includes receiving periodically measured azimuth pointing data for that particular wind turbine and calculating particular azimuth variation characteristics such as azimuth variation frequency or time period, azimuth variation speed, azimuth variation distance, amount of azimuth variation, other azimuth variation related characteristics, or combinations of these, based on the periodic azimuth measurements. The azimuth variation characteristics data, or the data used to determine the azimuth variation characteristics data, is received in an example from one or more of the wind farm controller 120, the central monitor data repository 142, other data repositories, or combinations of these The azimuth drive operations monitoring process 500 determines, at 504, a cluster of previously accumulated data that is most likely similar to the received measured azimuth variation characteristics data. In an example, this determination is made by a machine learning process that has been trained by the above described azimuth drive monitor training process 400.

The azimuth drive operations monitoring process 500 determines, at 506, whether the most likely similar cluster of previously accumulated azimuth variation characteristics data is indicative of normal operations. Examples of data clusters that are indicative of normal operations are discussed above as the normal cluster 310 in the azimuth variation data set clustering graph 300. In an example, normal operations include observing azimuth variation data that has not been noted to precede main drivetrain damage of the wind turbine. If it is determined that the received measured azimuth variation characteristics data is likely indicative of normal operations, the azimuth drive operations monitoring process 500 returns to receiving, at 502, measured azimuth variation characteristics data and the above described subsequent processing.

If it is determined that the received measured azimuth variation characteristics data is not likely indicative of normal operations, the azimuth drive operations monitoring process 500 determines, at 508, whether the most likely similar cluster of previously accumulated azimuth variation characteristics data is indicative of one or more of likely to have upcoming damage to the main drivetrain, damage to the main drivetrain, or damage to the azimuth drivetrain. Such a determination is able to be based upon, for example, a correlation of the most likely similar cluster of previously accumulated data and maintenance data that indicates that similar cluster is associated with azimuth variation measurements that were observed in association with upcoming or present damage to the main drivetrain of the wind turbine, upcoming or present damage to the azimuth drivetrain, or combinations of these. In one example, a similar cluster is associated with a condition of the main drivetrain that is a condition of likely to have upcoming damage to the main drivetrain.

If it is determined that the received measured azimuth variation characteristics data is likely indicative of one or more of upcoming or present main drivetrain damage, azimuth drivetrain damage, or combinations of these, the azimuth drive operations monitoring process 500 sends, at 512, a notification of at least one of likely upcoming or present main drivetrain damage, azimuth drivetrain damage, or combinations of these. Such a notification is able to be provided via, for example the maintenance alerts function 134. In an example, the maintenance alerts function 134 causes a maintenance crew or other trained personnel to be dispatched, at 514, to the wind turbine from which the measured azimuth variation characteristics data was received. The azimuth drive operations monitoring process 500 then returns to receiving, at 502, measured azimuth variation characteristics data as is described above, and with the subsequent processing as described above.

If it is determined that the received measured azimuth variation characteristics data is not likely indicative of damage to either the main drivetrain, the azimuth drivetrain, or both, the azimuth drive operations monitoring process 500 sends, at 510, a notification of likely abnormal operations of the azimuth drive. Such a notification is able to be handled as described above for a notification of at least one of likely upcoming or present main drivetrain damage, azimuth drivetrain damage, or combinations of these, and is able to result in dispatching a maintenance crew or other trained personnel to the wind turbine from which the measured azimuth variation characteristics data was received. In an example, indications of abnormal operations of the azimuth drive are able to correspond to azimuth variation data values that had been observed prior to damage to components of the main drivetrain, prior to damage to components of the azimuth drivetrain, or prior to damage to both drivetrains.

The azimuth drive operations monitoring process 500 in an example initiates, at 516, based on determining that a particular cluster of values that is the most likely similar cluster is a cluster of values that is indicative of upcoming or present main drivetrain damage, present azimuth drivetrain wear, or both, to monitor subsequently measured sets of azimuth variation characteristics data for that azimuth drivetrain to determine a progression of wear of that azimuth drivetrain. In general, once azimuth drivetrain wear has been detected, a process is able to monitor and analyze a sequence of azimuth variation characteristics data over a time period to determine the progress of azimuth variation characteristics degradation over that time period. In some examples, this monitoring is performed over iterations of the azimuth drive operations monitoring process 500. In an example, the progression of wear is able to be determine based upon, for example, determining that values in subsequently measured azimuth variation characteristics data are changing from values near values in the most likely similar cluster of values to values in clusters of values that are associated with present or upcoming damage to either or both of the main drivetrain or the azimuth drivetrain of the wind turbine.

In an example, a rate of wear for the azimuth drivetrain, and a determined projected remaining time to damage of either the main drivetrain or the azimuth drivetrain of a wind turbine, is determined, at 518. The rate of wear and projected remaining time to damage in an example is able to be determined by extrapolating how fast the indicated wear is progressing to data values in clusters of values that are indicative of main drivetrain damage, azimuth drivetrain damage, or both.

Maintenance of the main drivetrain, the azimuth drivetrain, or both, is scheduled, at 520. In various examples, the maintenance is able to be scheduled based on based on the determined progression of wear of the subject azimuth drivetrain. In some examples, maintenance of the azimuth drivetrain is able to be scheduled for an identified time where the identified time is selected based on one or more criteria. In an example, the identified time at which maintenance is scheduled is able to be selected based on the determined rate of wear. In some examples, monitoring of subsequently measured sets of azimuth variation characteristics data is able to support determining a projected remaining time until damage is expected to occur to the main drivetrain of the wind turbine or until damage is expected to occur to the azimuth drivetrain of that wind turbine. In some examples, the time to expected damage of the main drivetrain, the azimuth drivetrain, or both, is able to be based upon previously observed azimuth variation data that was collected prior to earlier noted damage to those components. In such an example, the identified time at which maintenance is scheduled is selected to be before an expiration of the remaining time until damage of the subject main drivetrain, the subject azimuth drivetrain, or both. In some examples, selecting an identified time for maintenance of the azimuth drivetrain is able to incorporate information defining anticipated generation requirements for the subject wind turbine such that the scheduled maintenance occurs during times of reduced power generation requirements.

After scheduling maintenance of the azimuth drivetrain, at 520, the azimuth drive operations monitoring process 500 returns to receiving, at 502, measured azimuth variation characteristics data and the above described subsequent processing.

The azimuth drive monitor training process 400 and the azimuth drive operations monitoring process 500 are part of a method for monitoring a wind turbine azimuth drivetrain. These processes in an example are executed by a wind turbine azimuth drivetrain monitor. In an example, these processes are included in a computer program product for monitoring a wind turbine azimuth drivetrain that includes instructions that, when executed, cause a processor onto implement the above described processes.

In an example, an amount of azimuth variation characteristics data is accumulated from at least one wind turbine over a period of time. A number of clusters of values within the plurality of azimuth variation characteristics data are identified and a respective condition of the wind turbine azimuth drivetrain is associated with each cluster of values in the plurality of clusters of values. Subsequent to associating the respective condition, a measured set of azimuth variation characteristics data is received for a subject azimuth drivetrain. An identified cluster with values of azimuth variation characteristics data that corresponds to values in the measured set of azimuth variation characteristics data for the subject azimuth drivetrain is determined and a respective condition associated with the identified cluster is determined as a subject condition associated with the subject azimuth drivetrain. The subject condition as a condition of the subject azimuth drivetrain is then reported. In some examples, definitions of a plurality of clusters of values within a plurality of azimuth variation characteristics data are stored and retrieved for comparison to measured data to determine conditions of the azimuth drivetrain.

In some examples, the identified clusters of values include a first set of clusters and a second set of clusters. In these examples, a first set of conditions is associated with clusters in the first set of clusters where each condition in the first set of conditions is associated with drivetrain wear, and a second set of conditions is associated with clusters in the second set of clusters where each condition in the second set of conditions is associated with drivetrain damage. The subject condition is reported in these examples includes notifying, based upon determining the subject condition is in the first set of conditions, a worn condition of the subject azimuth drivetrain, and notifying, based upon determining the subject condition is in the second set of conditions, a damaged condition of the subject azimuth drivetrain.

In some examples, based upon determining the subject condition is in the first set of conditions, subsequently measured sets of azimuth variation characteristics data for the subject azimuth drivetrain of the subject wind turbine are monitored to determine a progression of wear of the subject azimuth drivetrain. Maintenance of the subject azimuth drivetrain is scheduled based on the determined progression of wear of the subject azimuth drivetrain. In some examples, an identified time for maintenance of the subject azimuth drivetrain is selected based on anticipated generation requirements for the subject wind turbine.

In some examples, scheduling maintenance of the subject azimuth drivetrain is based on the identified time for maintenance of the subject azimuth drivetrain. In some examples, monitoring subsequently measured sets of azimuth variation characteristics data includes determining a rate of wear of the subject azimuth drivetrain where the identified time is selected based on the determined rate of wear. In some examples, monitoring subsequently measured sets of azimuth variation characteristics data includes determining a projected remaining time until damage of the subject azimuth drivetrain, where the identified time is selected to be before an expiration of the remaining time until damage of the subject azimuth drivetrain.

Figure 6:
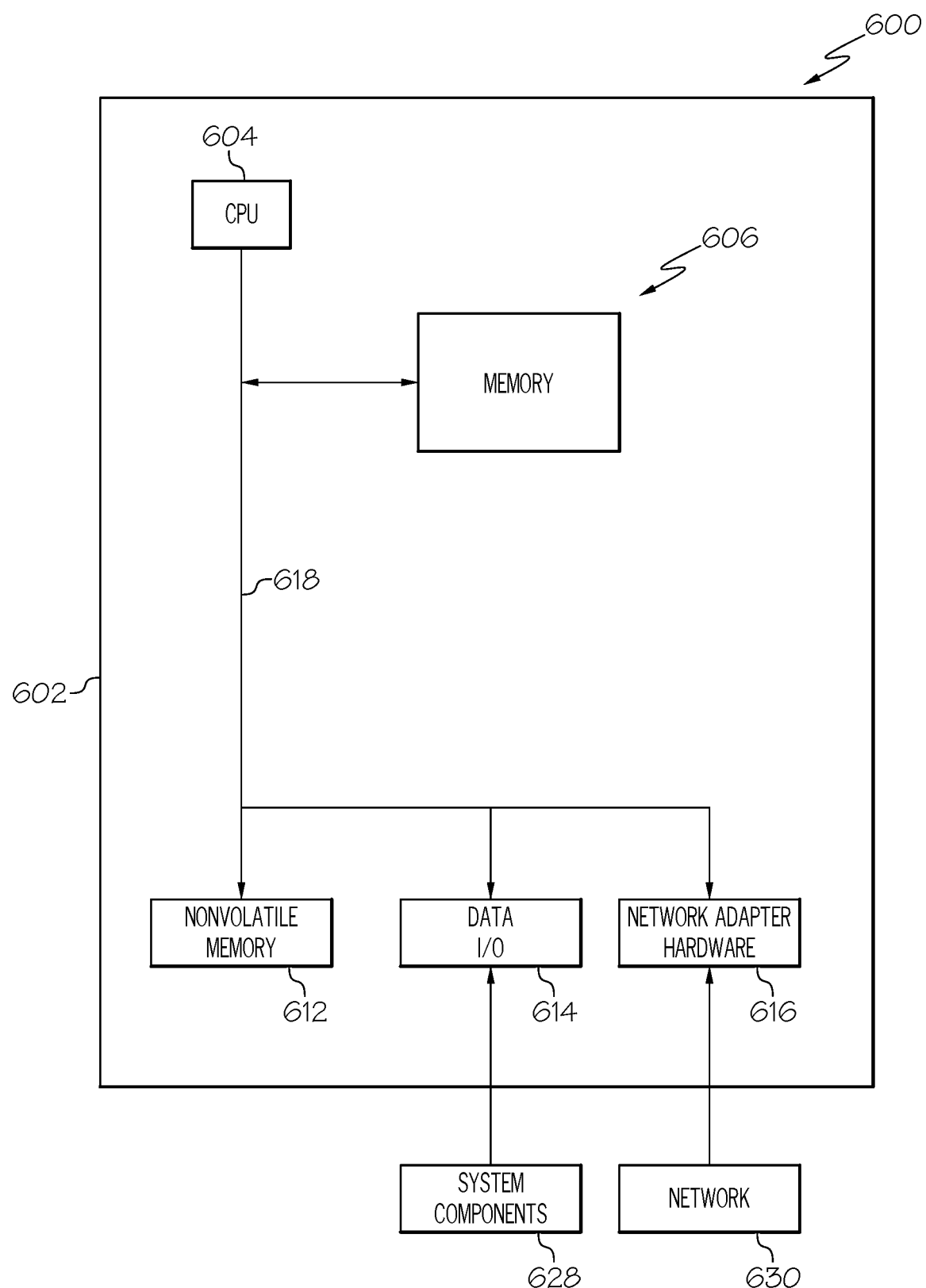
FIG. 6 illustrates a block diagram illustrating a controller, according to an example.

FIG. 6 illustrates a block diagram illustrating a controller 600 according to an example. The controller 600 is an example of a processing subsystem that is able to perform any of the above described processing operations, control operations, other operations, or combinations of these.

The controller 600 in this example includes a CPU 604 that is communicatively connected to a main memory 606 (e.g., volatile memory), a non-volatile memory 612 to support processing operations. The CPU is further communicatively coupled to a network adapter hardware 616 to support input and output communications with external computing systems such as through the illustrated network 630.

The controller 600 further includes a data input/output (I/O) processor 614 that is able to be adapted to communicate with any type of equipment, such as the illustrated system components 628. The data input/output (I/O) processor in various examples is able to be configured to support any type of data communications connections including present day analog and/or digital techniques or via a future communications mechanism. A system bus 618 interconnects these system components.

In other examples, azimuth offset may be based not only on wind direction, but also air temperature, air humidity and other atmospheric affects.

Information Processing System

The present subject matter can be realized in hardware, software, or a combination of hardware and software. A system can be realized in a centralized fashion in one computer system, or in a distributed fashion where different elements are spread across several interconnected computer systems. Any kind of computer system—or other apparatus adapted for carrying out the methods described herein—is suitable. A typical combination of hardware and software could be a general purpose computer system with a computer program that, when being loaded and executed, controls the computer system such that it carries out the methods described herein.

The present subject matter can also be embedded in a computer program product, which comprises all the features enabling the implementation of the methods described herein, and which—when loaded in a computer system—is able to carry out these methods. Computer program in the present context means any expression, in any language, code or notation, of a set of instructions intended to cause a system having an information processing capability to perform a particular function either directly or after either or both of the following a) conversion to another language, code or, notation; and b) reproduction in a different material form.

Each computer system may include, inter alia, one or more computers and at least a computer readable medium allowing a computer to read data, instructions, messages or message packets, and other computer readable information from the computer readable medium. The computer readable medium may include computer readable storage medium embodying non-volatile memory, such as read-only memory (ROM), flash memory, disk drive memory, CD-ROM, and other permanent storage. Additionally, a computer medium may include volatile storage such as RAM, buffers, cache memory, and network circuits. Furthermore, the computer readable medium may comprise computer readable information in a transitory state medium such as a network link and/or a network interface, including a wired network or a wireless network, that allow a computer to read such computer readable information. In general, the computer readable medium embodies a computer program product as a computer readable storage medium that embodies computer readable program code with instructions to control a machine to perform the above described methods and realize the above described systems.

Non-Limiting Examples

Although specific embodiments of the subject matter have been disclosed, those having ordinary skill in the art will understand that changes can be made to the specific embodiments without departing from the spirit and scope of the disclosed subject matter. The scope of the disclosure is not to be restricted, therefore, to the specific embodiments, and it is intended that the appended claims cover any and all such applications, modifications, and embodiments within the scope of the present disclosure.

What is claimed is:

1. A method for monitoring a wind turbine azimuth drivetrain, the method comprising:
   accumulating a plurality of azimuth variation characteristics data from at least one wind turbine over a period of time;
   identifying a plurality of clusters of values within the plurality of azimuth variation characteristics data, where each cluster of values in the plurality of azimuth variation characteristics data is associated with a respective wind turbine;
   associating each respective cluster of values in the plurality of clusters of values with a respective condition of a respective main drivetrain for the respective wind turbine associated with the respective cluster of values;
   identifying at least one selected cluster of values that comprise measurements made in time proximate to one of a drive mechanism failure or an indication of a drive mechanism requiring maintenance;
   based on identifying the at least one selected cluster, training a machine learning model with the at least one selected cluster labeled as corresponding to one of a drive mechanism failure or an indication of a drive mechanism requiring maintenance, where the machine learning model is configured to process azimuth variation characteristics to identify received azimuth variation characteristics data that correspond to the one of a drive mechanism failure or the indication of a drive mechanism requiring maintenance;
   receiving, subsequent to associating the respective cluster of values with the respective condition, a measured set of azimuth variation characteristics data for a subject azimuth drivetrain of a subject wind turbine;
   processing, subsequent to and based on training the machine learning model, the measured set of azimuth variation characteristics data with the machine learning model to determine an identified cluster with values of azimuth variation characteristics data that corresponds to values in the measured set of azimuth variation characteristics data for the subject azimuth drivetrain, where the identified cluster has been determined to, based on training of the machine learning model, to comprise azimuth variation characteristics corresponding to the one of a drive mechanism failure or the indication of a drive mechanism requiring maintenance;
   determining that a respective condition associated with the identified cluster is a subject condition associated with a subject main drivetrain of the subject wind turbine; and
   reporting the subject condition as a condition of the subject main drivetrain.

2. The method of claim 1, wherein the respective condition of the main drivetrain comprises a condition of likely to have upcoming damage to the main drivetrain.

3. The method of claim 1, further comprising
   associating each cluster of values in the plurality of clusters of values with a respective condition of a respective azimuth drivetrain of the respective wind turbine associated with the respective cluster of values; and
   determining that a respective condition associated with the identified cluster is a subject condition associated with the subject azimuth drivetrain,
   where the reporting further comprises reporting the subject condition as a condition of the subject azimuth drivetrain.

4. The method of claim 1, where identifying the plurality of clusters of values comprises processing the azimuth variation characteristics data with an unsupervised learning process to identify clusters of values within the azimuth variation characteristics data.

5. The method of claim 1, wherein the training a machine learning model comprises:
   the identifying a plurality of clusters of values within the plurality of azimuth variation characteristics data;
   the associating each respective cluster of values with the respective condition of the respective main drivetrain; and
   the identifying the subject condition based upon processing by the machine learning model.

6. The method of claim 1, further comprising:
   receiving, in association with each respective value within the plurality of azimuth variation characteristics data, a respective control mode indication within a plurality of control modes of the at least one wind turbine that was in effect during measurement of the each respective value within the plurality of azimuth variation characteristics data; and
   associating, based on the respective control mode indication that was in effect during measurement of each respective value within the plurality of azimuth variation characteristics data, each respective value in the plurality of azimuth variation characteristics data with a respective bin of a plurality of bins, where each respective bin is associated with a respective control mode of the at least one wind turbine that is associated with that respective bin,
   where the identifying the plurality of clusters of values identifies separate clusters of values within each bin of the plurality of bins,
   where a measurement control mode within the plurality of control modes was in effect for the at least one wind turbine when the measured set of azimuth variation characteristics data was measured, and
   where determining the identified cluster comprises identifying the identified cluster within the respective bin associated with the measurement control mode.

7. The method of claim 1, further comprising:
   receiving maintenance data indicating a plurality of maintenance actions performed on the at least one wind turbine over the period of time,
   where associating each respective cluster of values in the plurality of clusters of values with a respective condition of a respective main drivetrain comprises:
   determining at least one respective set of azimuth variation characteristics data within the plurality of azimuth variation characteristics data that is associated with at least one maintenance action within the plurality of maintenance actions;
determining a particular condition of the main drivetrain that is associated with the at least one maintenance action; and
associating the particular condition with a cluster of values comprising the at least one respective set of azimuth variation characteristics.

8. The method of claim 7, where determining at least one respective set of azimuth variation characteristics data within the plurality of azimuth variation characteristics data that is associated with at least one maintenance action within the plurality of maintenance actions comprises performing association rule learning.

9. A wind turbine azimuth drivetrain monitor, comprising:
a model building engine that, when operating:
accumulate a plurality of azimuth variation characteristics data from at least one wind turbine over a period of time;
identifies a plurality of clusters of values within the plurality of azimuth variation characteristics data, where each cluster of values in the plurality of azimuth variation characteristics data is associated with a respective wind turbine; and
associates each respective cluster of values in the plurality of clusters of values with a respective condition of a respective main drivetrain for the respective wind turbine associated with the respective cluster of values;
identify at least one selected cluster of values that comprise measurements made in time proximate to one of a drive mechanism failure or an indication of a drive mechanism requiring maintenance; and
a model based monitoring engine that, when operating:
based on identifying the at least one selected cluster, train a machine learning model with the at least one selected cluster labeled as corresponding to one of a drive mechanism failure or an indication of a drive mechanism requiring maintenance, where the machine learning model is configured to process azimuth variation characteristics to identify received azimuth variation characteristics data that correspond to the one of a drive mechanism failure or the indication of a drive mechanism requiring maintenance;
receives, subsequent to associating the respective condition, a measured set of azimuth variation characteristics data for a subject azimuth drivetrain of a subject wind turbine;
process, subsequent to and based on training the machine learning model, the measured set of azimuth variation characteristics data with the machine learning model to determine an identified cluster with values of azimuth variation characteristics data that corresponds to values in the measured set of azimuth variation characteristics data for a subject azimuth drivetrain, where the identified cluster has been determined to, based on training of the machine learning model, to comprise azimuth variation characteristics corresponding to the one of a drive mechanism failure or the indication of a drive mechanism requiring maintenance;
determines that a respective condition associated with the identified cluster is a subject condition associated with a subject main drivetrain of the subject wind turbine; and
reports the subject condition as a condition of the subject main drivetrain.

10. The wind turbine azimuth drivetrain monitor of claim 9, where the model building engine, when operating, identifies the plurality of clusters of values by at least identifying values of azimuth variation characteristics data that are within a threshold value of one another.

11. The wind turbine azimuth drivetrain monitor of claim 9, where the model building engine, when operating, further:
receives, in association with each respective value within the plurality of azimuth variation characteristics data, a respective control mode indication within a plurality of control modes of the at least one wind turbine that was in effect during measurement of the each respective value within the plurality of azimuth variation characteristics data; and
associates, based on the respective control mode indication that was in effect during measurement of each respective value within the plurality of azimuth variation characteristics data, each respective value in the plurality of azimuth variation characteristics data with a respective bin of a plurality of bins, where each respective bin is associated with a respective control mode of the at least one wind turbine that is associated with that respective bin,
where the model building engine, when operating, identifies the plurality of clusters of values by at least identifying separate clusters of values within each bin of the plurality of bins,
where a measurement control mode within the plurality of control modes was in effect for the at least one wind turbine when the measured set of azimuth variation characteristics data was measured, and
where the model building engine, when operating, determines the identified cluster by at least identifying the identified cluster within the respective bin associated with the measurement control mode.

12. The wind turbine azimuth drivetrain monitor of claim 9, where the model building engine, when operating, further:
receives maintenance data indicating a plurality of maintenance actions performed on the at least one wind turbine over the period of time,
where the model building engine, when operating, associates the respective condition of the main drivetrain with each cluster of values by at least:
determining at least one respective set of azimuth variation characteristics data within the plurality of azimuth variation characteristics data that is associated with at least one maintenance action within the plurality of maintenance actions;
determining, by at least performing association rule learning, a particular condition of the main drivetrain that is associated with the at least one maintenance action; and
associating the particular condition with a cluster of values comprising the at least one respective set of azimuth variation characteristics.

13. A method for monitoring a wind turbine azimuth drivetrain, the method comprising:
storing a definition of a plurality of clusters of values within a plurality of azimuth variation characteristics data,
where the plurality of azimuth variation characteristics data is accumulated from at least one wind turbine over a period of time, and
where each respective cluster of values in the plurality of clusters of values is associated with a respective condition of a respective main drivetrain for a respective wind turbine associated with the respective cluster of values;

identifying at least one selected cluster of values that comprise measurements made in time proximate to one of a drive mechanism failure or an indication of a drive mechanism requiring maintenance;

based on identifying the at least one selected cluster, training a machine learning model with the at least one selected cluster labeled as corresponding to one of a drive mechanism failure or an indication of a drive mechanism requiring maintenance, where the machine learning model is configured to process azimuth variation characteristics to identify received azimuth variation characteristics data that correspond to the one of a drive mechanism failure or the indication of a drive mechanism requiring maintenance;

receiving a measured set of azimuth variation characteristics data for a subject azimuth drivetrain of a subject wind turbine;

processing, subsequent to and based on training the machine learning model, the measured set of azimuth variation characteristics data with the machine learning model to determine an identified cluster within the plurality of clusters of values, the identified cluster comprising values of azimuth variation characteristics data that correspond to values in the measured set of azimuth variation characteristics data for the subject azimuth drivetrain, where the identified cluster has been determined to, based on training of the machine learning model, to comprise azimuth variation characteristics corresponding to the one of a drive mechanism failure or the indication of a drive mechanism requiring maintenance;

determining that a respective condition associated with the identified cluster is a subject condition associated with a subject main drivetrain; and reporting the subject condition as a condition of the subject main drivetrain of the subject wind turbine.

14. The method of claim 13, wherein the respective condition of the main drivetrain comprises likely to have upcoming damage to the main drivetrain.

15. The method of claim 14, further comprising:
dispatching, based upon determining the subject condition is in the second set of conditions, repair crews to repair the subject azimuth drivetrain.

16. The method of claim 14, further comprising:
monitoring, based upon determining the subject condition is in the first set of conditions, subsequently measured sets of azimuth variation characteristics data for the subject azimuth drivetrain of the subject wind turbine to determine a progression of wear of the subject azimuth drivetrain; and scheduling, based on the determined progression of wear of the subject azimuth drivetrain, maintenance of the subject azimuth drivetrain.

17. The method of claim 16, further comprising:
selecting an identified time for maintenance of the subject azimuth drivetrain based on anticipated generation requirements for the subject wind turbine, where scheduling maintenance of the subject azimuth drivetrain is based on the identified time for maintenance of the subject azimuth drivetrain.

18. The method of claim 17, wherein the monitoring subsequently measured sets of azimuth variation characteristics data comprises determining a rate of wear of the subject azimuth drivetrain, and wherein the identified time is selected based on the determined rate of wear.

19. The method of claim 17, wherein the monitoring subsequently measured sets of azimuth variation characteristics data comprises determining a projected remaining time until damage of the subject azimuth drivetrain, and wherein the identified time is selected to be before an expiration of the remaining time until damage of the subject azimuth drivetrain.

20. The method of claim 13,
where a respective condition of the azimuth drivetrain is associated with each cluster of values in the plurality of clusters of values, where the plurality of clusters of values comprises a first set of clusters and a second set of clusters, where
a first set of conditions is associated with clusters in the first set of clusters where each condition in the first set of conditions is associated with azimuth drivetrain wear, and
a second set of conditions is associated with clusters in the second set of clusters where each condition in the second set of conditions is associated with azimuth drivetrain damage;

where reporting the subject condition comprises:
notifying, based upon determining the subject condition is in the first set of conditions, a worn condition of the subject azimuth drivetrain, and
notifying, based upon determining the subject condition is in the second set of conditions, a damaged condition of the subject azimuth drivetrain.

* * * * *